(12) United States Patent
Eriksson et al.

(10) Patent No.: US 11,134,540 B2
(45) Date of Patent: Sep. 28, 2021

(54) MIXED MODE BLUETOOTH COMMUNICATIONS

(71) Applicant: INTEL IP CORPORATION, Santa Clara, CA (US)

(72) Inventors: Hakan Magnus Eriksson, Portland, OR (US); Vivek Krishnan Devarajan, Hillsboro, OR (US); Prasanna Desai, Elfin Forest, CA (US); Djordje Kokotovic, San Diego, CA (US); Jayant Somani, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/646,342

(22) PCT Filed: Dec. 28, 2017

(86) PCT No.: PCT/US2017/068707
§ 371 (c)(1),
(2) Date: Mar. 11, 2020

(87) PCT Pub. No.: WO2019/050556
PCT Pub. Date: Mar. 14, 2019

(65) Prior Publication Data
US 2020/0275525 A1 Aug. 27, 2020

Related U.S. Application Data

(60) Provisional application No. 62/556,666, filed on Sep. 11, 2017.

(51) Int. Cl.
*H04W 88/06* (2009.01)
*H04W 76/14* (2018.01)
(Continued)

(52) U.S. Cl.
CPC .............. *H04W 88/06* (2013.01); *H04W 4/80* (2018.02); *H04W 28/04* (2013.01); *H04W 76/14* (2018.02)

(58) Field of Classification Search
CPC ....... H04W 4/80; H04W 84/18; H04W 76/14; H04W 76/10; H04W 4/021; H04W 84/12;
(Continued)

(56) References Cited

U.S. PATENT DOCUMENTS

2003/0103521 A1* 6/2003 Raphaeli ................ H04B 3/542
370/445
2015/0327001 A1* 11/2015 Kirshenberg ......... H04W 76/11
455/41.2

(Continued)

OTHER PUBLICATIONS

International Search Report dated Mar. 29, 2018 for International Application No. PCT/US2017/068707.

*Primary Examiner* — Ajibola A Akinyemi
(74) *Attorney, Agent, or Firm* — Eschweiler & Potashnik, LLC (57) ABSTRACT

A device and a method for mixed mode communication are disclosed. For example, a Bluetooth master device transmits data packets to a Bluetooth slave device and receives acknowledgments from the Bluetooth slave device, by controlling a transceiver to transmit the data packets based on a Bluetooth Basic Rate/Enhanced Data Rate (BR/EDR) protocol, and to receive the acknowledgements packet (ACK) based on a Bluetooth Low Energy (BLE) protocol. In another example, a Bluetooth slave device receives the data packets from a Bluetooth master device and transmits acknowledgments to the Bluetooth master device, by controlling a transceiver to receive the data packets based on a BR/EDR protocol, and to transmit the ACK based on a BLE protocol.

22 Claims, 6 Drawing Sheets

(51) Int. Cl.
*H04W 4/80* (2018.01)
*H04W 28/04* (2009.01)

(58) Field of Classification Search
CPC ......... H04W 88/06; H04W 4/12; H04W 4/70;
H04W 8/005; H04W 72/1215; H04W
4/02; H04W 4/023; H04W 4/06; H04W
4/14; H04W 76/15; H04W 84/20; H04W
24/10; H04W 4/029
USPC ....................................................... 455/41.2
See application file for complete search history.

(56) References Cited

U.S. PATENT DOCUMENTS

2017/0093727 A1    3/2017   Chen et al.
2017/0134227 A1*  5/2017   Song .................... H04L 1/1887

* cited by examiner

MIXED MODE BLUETOOTH COMMUNICATIONS

This application is a National Phase entry application of International Patent Application No. PCT/US2017/068707 filed on Dec. 28, 2017, which claims priority to U.S. Provisional Application 62/556,666 filed on Sep. 11, 2017, and is hereby incorporated by reference in its entirety.

BACKGROUND

Bluetooth Basic Rate/Enhanced Data Rate (BR/EDR) and Bluetooth Low Energy (BLE) are two protocols that are widely adopted to support low-powered short-range communications between devices. A Bluetooth device may be a master or a slave device. The data packet is transmitted by the master device and an acknowledgment (ACK) packet is transmitted by the slave device. For example, suppose a user is using a Bluetooth capable headset to listen to music being streamed by a mobile phone. Then, the mobile phone is the audio source device and serves as the master device. The headset serves as the slave device. As the master device, the mobile phone transmits packets with compressed audio payload to the headset. In return, as the slave device, the headset transmits ACK packets.

Both the Bluetooth BR/EDR and the BLE protocols provide a capability to transmit at a high modulation rate and receive at a low modulation rate. For example, a device transmitting using the BR/EDR protocol may transmit at a modulation rate of 3 Mbps and receive at a modulation rate of 1 Mbps. Similarly, a device transmitting using the BLE protocol may transmit at a modulation rate of 1 Mbps or 2 Mbps, and receive at a modulation rate of 125 Kbps or 500 Kbps. Brief descriptions of the BR/EDR and BLE operations are provided in Section A.

In order to support services, the link between the master and slave devices is kept above a certain error performance level. For example, the Signal-to-Noise Ratio (SNR) is kept at an acceptable level for a given data rate. One approach to maintain a good SNR level is to have the device transmit at a higher power level. For example, a BLE device may include an external Power Amplifier (PA) to achieve a +20 dBm transmit power level. Unfortunately, achieving the desired transmit power level may create other design issues. For example, small wearable devices may need to comply with: regulatory requirements for Specific Absorption Rate (SAR), requirements for power consumption, requirements for a physical size, and so on. For instance, a hearing aid would need to fit into an ear canal of the person wearing it. Headsets, smart watches, smart fitness trackers, etc., would need to meet SAR requirements, be lightweight, avoid overheating while being worn, avoid overheating while being placed in a pocket, etc. Implementing the external PA on these types of devices is challenging and may limit the types of services that can be provided to users via wearable devices that are Bluetooth capable. Therefore, conventional ways to support high data rate communications using the Bluetooth protocols are suboptimal.

BRIEF DESCRIPTION OF THE DRAWINGS

The teaching of the present disclosure can be more fully understood by reading the subsequent detailed description and examples in conjunction with references made to the accompanying drawings, in which.

To facilitate reading, identical reference numbers are used to designate elements that are common to various figures, where possible.

DETAILED DESCRIPTION

The present disclosure relates to a device and a method for supporting mixed mode Bluetooth communications. For example, a master device may so transmit using the BR/EDR protocol while a slave device transmits using the BLE protocol. The mixed mode communication is provided without necessitating an external PA in the slave device.

Figure 1:
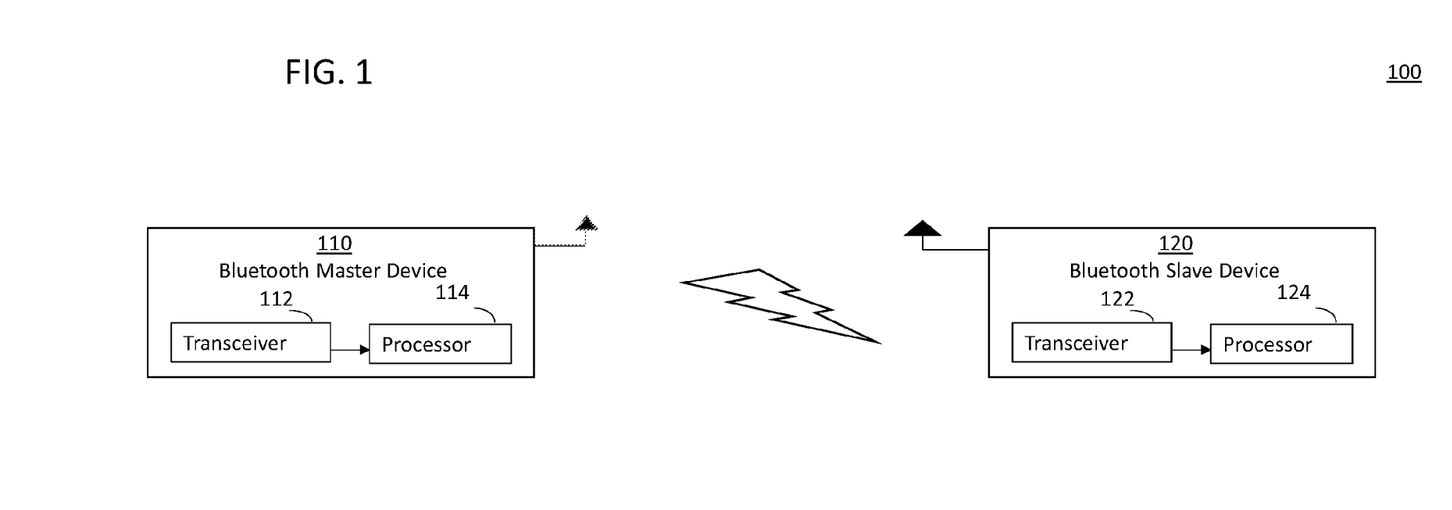
FIG. 1 illustrates a Bluetooth system for supporting communications between Bluetooth capable master and slave devices.

FIG. 1 illustrates a Bluetooth system 100 for supporting communications between Bluetooth capable master and slave devices. The system 100 comprises a Bluetooth-enabled master device 110 and a Bluetooth enabled slave device 120 communicating over a wireless channel. For example, the master device 110 may be a mobile phone, a computer, a smart device, and the slave device 120 may be a peripheral device, e.g., a headset, a smart watch, a printer, and the like.

Each of the master device 110 and the slave device 120 may comprise any number of antennas. Moreover, the antennas may be used to receive or transmit Bluetooth BR/EDR or BLE signals. In one aspect, a device may comprise one antenna tuned to receive or transmit the BR/EDR radio frequency signal and another antenna for the BLE radio frequency signals. In another aspect, the antenna may operate in dual mode to receive or transmit either type of signal. Those ordinarily skilled in the present art realize that the antennas of the present disclosure may be antennas of a transceiver that may be used for both transmitting and receiving of a wireless signal.

The Bluetooth master device 110 comprises a transceiver 112 and a processor 114.

The transceiver 112 is configured to transmit to the Bluetooth slave device 120 a data packet and receive from the Bluetooth slave device 120 an acknowledgement packet (ACK). The processor 114 is configured to enable the Bluetooth master device 110 to perform mixed mode communication with the Bluetooth slave device 120. The mixed mode communication is enabled by the processor 114 being configured to control the transceiver 112, to transmit to the Bluetooth slave device 120 a data packet based on a Bluetooth Basic Rate/Enhanced Data Rate (BR/EDR) protocol, and to receive from the Bluetooth slave device 120 via the transceiver 112 an acknowledgement packet (ACK) based on a Bluetooth Low Energy (BLE) protocol.

Similarly, the Bluetooth slave device 120 comprises a transceiver 122 and a processor 124. The transceiver 122 of the slave device 120 is configured to receive data packets from the Bluetooth master device 110 and transmit ACKs. The processor 124 of the slave device 120 is configured to enable the Bluetooth slave device 120 to perform mixed mode communication with the Bluetooth master device 110. The mixed mode communication is enabled by the processor 124 of the slave device 120 being configured to control the transceiver 122 of the slave device 120 to receive from the Bluetooth master device 110 a data packet based on the BR/EDR protocol, and to transmit to the Bluetooth master device 110 the ACKs based on the BLE protocol. When the mixed mode communication is enabled, the processor 124 of the slave device 120 is configured to control the transceiver 122 of the slave device 120 to transmit the ACK without using an external power amplifier.

A modulation rate of the Bluetooth BR/EDR protocol is higher than a modulation rate of the BLE protocol. Brief descriptions of the BR/EDR and BLE operations and modulation rates are provided in Section A.

The processor 114 is configured to determine whether the Bluetooth slave device 120 supports the mixed mode communication. If the mixed mode communication is not supported by the Bluetooth slave device 120, the communication between the master device 110 and the slave device 120 proceeds in a standard mode. For example, either the BR/EDR protocol or the BLE protocol may be used in both directions of transmission. In contrast, if the mixed mode communication is supported, the master device 110 may begin a process to transition to the mixed mode communication as described below.

In one aspect, the processor 114 is configured to determine a time to enable the mixed mode communication, and to enable the mixed mode communication at the enable time. In other words, the enable time is determined by the processor 114 of the master device 110.

The mixed mode communication is initiated by the master device 110 or by the slave device 120. For example, the slave device 120 may send a request to the master device 110 requesting that the master device 110 enable the mixed mode communication. In other words, the master device 110 may autonomously trigger a procedure to transition to the mixed mode communication. In contrast, the slave device 120 may send a request to the master device 110 indicating a desire to switch to the mixed mode communication. In turn, the master device 110 may invoke a procedure for enabling the mixed mode communication. An example of a timing diagram in accordance with the mixed mode communication, and an example of a Link Manager Protocol (LMP) for transitioning to the mixed mode communication are provided in Section A.

A slave device 120 that sends the request to the master device 110 may be referred to as the device that enables the mixed mode communication. Thus, the above description regarding initiating a request for switching to mixed mode communication versus enabling the mixed mode communication is not intended to limit the breadth and the scope of the implementation.

After the mixed mode communication is enabled, the processor 110 expects to receive the ACK from the Bluetooth slave device 120 via its transceiver 112. The ACK is expected to be received within a period of time which is based on an inter frame spacing of the BLE protocol. It is noted that the slave device 120 may accept or deny the mixed mode communication, regardless of which device initiated the mixed mode transmission.

The processor 124 of the slave device 120 is configured to control the transceiver 122 of the slave device 120 to transmit to the Bluetooth master device 110 the ACK in accordance with an ACK aggregation scheme that is based on aggregating ACKs during an aggregation window. In one aspect, the aggregation window comprises a number of data packets that can be transmitted to the Bluetooth slave device 120 without the Bluetooth slave device 120 transmitting the ACK. In return, the ACK is received by the Bluetooth master device 110 from the Bluetooth slave device 120 via the transceiver 114 of the master device 110 in accordance with the ACK aggregation scheme that is based on aggregating ACKs during an aggregation window. An example of an ACK aggregation scheme is provided in Section A.

The ACK aggregation scheme is enabled at a selected time. The time for enabling the ACK aggregation scheme is selected by the processor 114 of the master device 110.

The master device 110 is configured to provide the aggregation window to the Bluetooth slave device 120. For example, the processor 114 of the master device 110 transmits the aggregation window to the slave device 120 via the transceiver 112 of the master device 110. In turn, the processor 124 of the slave device 120 may receive the aggregation window via the transceiver 122 of the slave device 120. It is noted that the same aggregation window is used by the master and slave devices 110, 120.

The aggregation window is maintained on the transceivers 112, 122 of the master and slave devices 100, 120. Equivalently, if a transmitter and a receiver are provided separately for a device, the aggregation window is maintained on both the transmitter and the receiver.

The ACK aggregation scheme is initiated based on a quality of a communications channel between the Bluetooth master device 110 and the Bluetooth slave device 120. The processor of the master device 110 is configured to measure the quality of the communications channel between the Bluetooth master device 110 and the Bluetooth slave device 120. The quality of the communication channel is determined after the communication channel has been measured for a predetermined period of time.

If the communication channel quality exceeds a predetermined channel quality threshold, the processor 114 of the master device 110 is configured to enable the ACK aggregation scheme. The ACK aggregation scheme is enabled for aggregating ACKs over the aggregation window, as described above.

The processor 114 of the master device 110 is configured to determine when the communication channel quality falls below the predetermined channel quality threshold. For example, the master device 110 monitors the channel quality such that a determination can be made on whether the ACK aggregation should be disabled.

If the communication channel quality falls below the predetermined channel quality threshold, the processor 114 is configured to disable the ACK aggregation scheme. The master device 110 or the slave device 120 may disable the ACK aggregation scheme. For example, either device 110, 120 may initiate a procedure to exit the ACK aggregation scheme.

The processor 114 is configured to disable the mixed mode communication. The master device 110 or the slave device 120 may disable the mixed mode communication. For example, either device 110, 120 may initiate a procedure to exit the mixed mode communication and return to a standard communication.

The aggregation window maintained on the transceiver 112 of the master device 110 is incremented by one each time an ACK is received. In one aspect, the aggregation window is incremented up to a maximum of four.

The aggregation window maintained on the transceiver 122 of the slave device 120 is incremented when a next expected sequence number of a received data packet is different from a next expected sequence number of a previously received data packet. An ACK aggregation scheme is further described below in Section A.

It is noted that transmitting the ACKs in accordance with the ACK aggregation scheme reduces transmit power—thereby increasing the power efficiency of the slave device 120. In addition, since the master device 120 is processing fewer ACKs, the power efficiency of the master device 120 is also improved.

Figure 2:
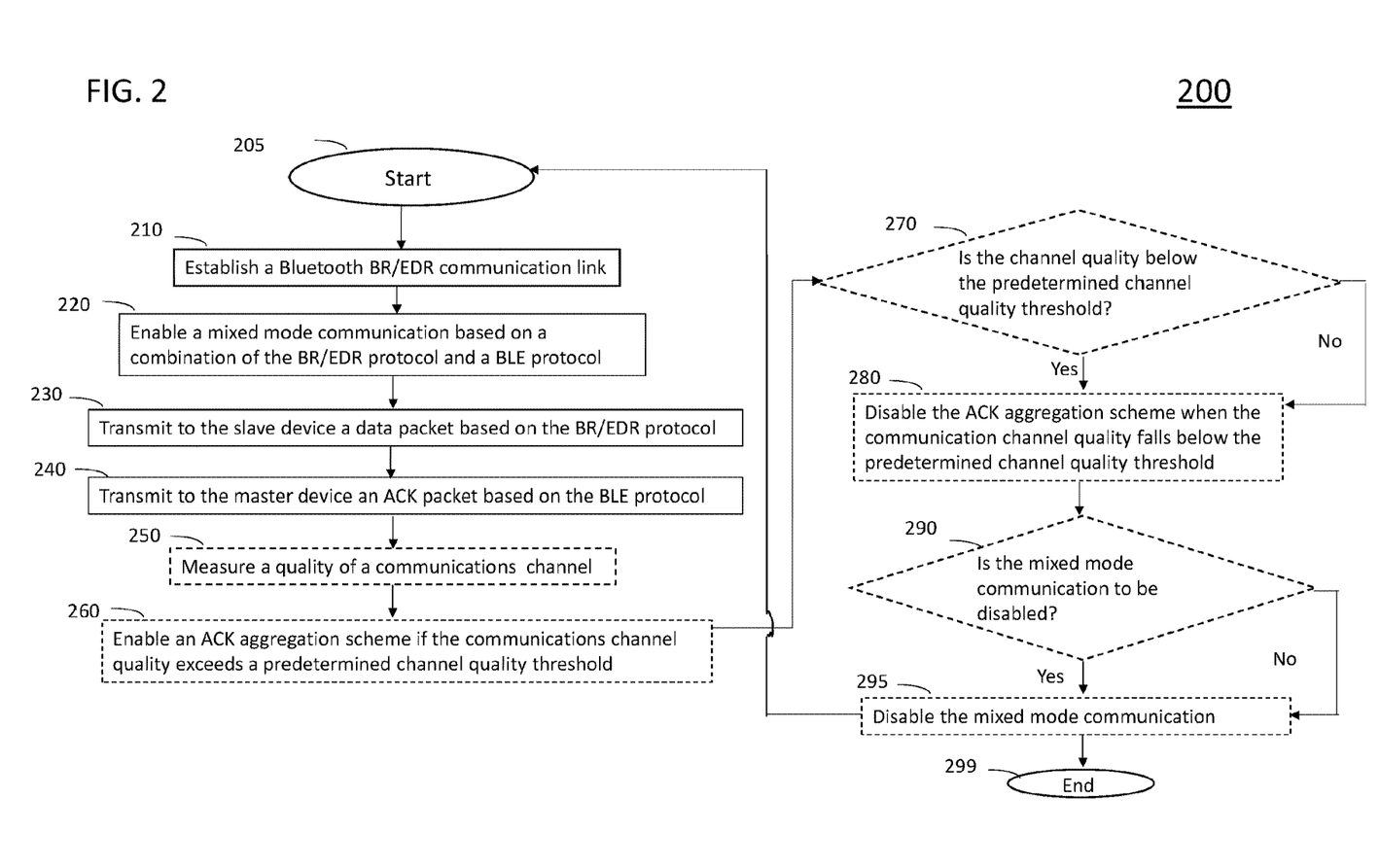
FIG. 2 illustrates a flowchart of an example method for mixed mode communication in accordance with the present disclosure.

FIG. 2 illustrates a flowchart of an example method 200 for mixed mode communication in accordance with the present disclosure.

In step 210, a master device 110, establishes a Bluetooth Basic Rate/Enhanced Data Rate (BR/EDR) communication link between the master device 110 and a slave device 120.

In step 220, by either the master device 110 or the slave device 120, the method enables a mixed mode communication based on a combination of the Bluetooth BR/EDR protocol and a Bluetooth Low Energy (BLE) protocol.

In step 230, the master device 110 transmits to the slave device 120 a data packet based on the Bluetooth BR/EDR protocol.

In step 240, by the slave device 120 transmits to the master device 110 an acknowledgement packet (ACK) based on the BLE protocol.

In optional step 250, the master device 110 measures a quality of a communication channel between the Bluetooth master device and the Bluetooth slave device 120.

In optional step 260, if the communication channel quality exceeds a predetermined channel quality threshold, the master device 110 enables an ACK aggregation scheme based on aggregating ACKs over an aggregation window.

In optional step 270, the master device 110 determines when the communication channel quality falls below the predetermined channel quality threshold. When the communication channel quality falls below the predetermined channel quality threshold, the method proceeds to optional step 280. Otherwise, the method proceeds to optional step 290.

In optional step 280, by the master device 110 disables the ACK aggregation scheme.

In optional step 290, the master device 110 or slave device 120 determines whether the mixed mode communication is to be disabled. If the mixed mode communication is to be disabled, the method proceeds to optional step 295. Otherwise, the method proceeds to step 299.

In optional step 295, the master device 110 or slave device 120 disables the mixed mode communication. The method may then proceed to step 299 to end the communication or to step 205 to continue Bluetooth communication in accordance with the present disclosure.

Figure 3:
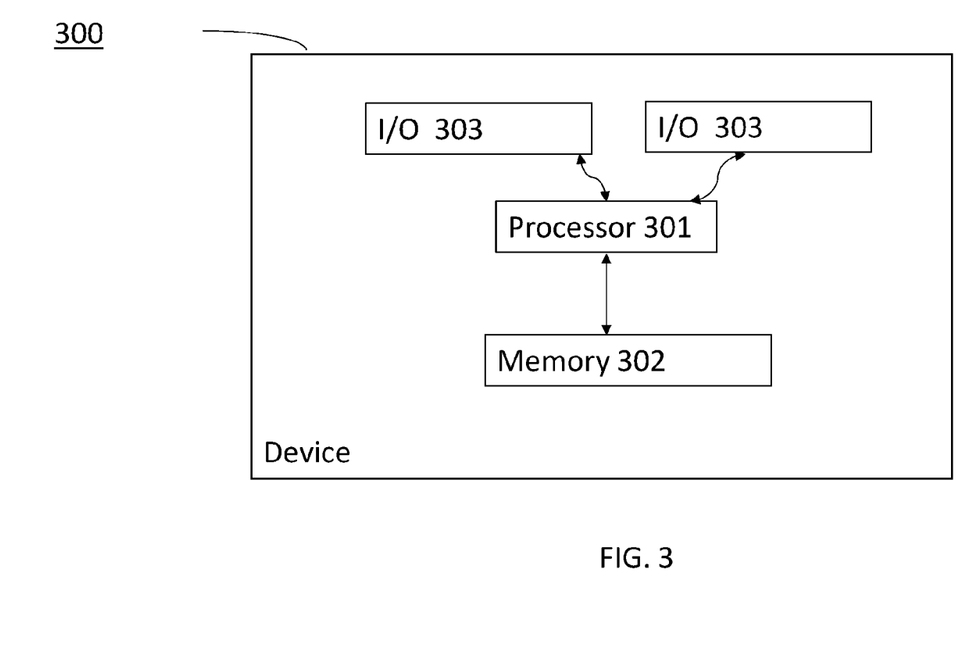
FIG. 3 illustrates a device for performing the functions described in the present disclosure.

FIG. 3 illustrates a device 300 for performing the functions of a master device 110 or a slave device 120 described in the present disclosure. The device 300 comprises a processor 301 and a memory 302 configured to store program instructions to be executed by the processor 301, where executing the program instructions causes the processor 301 to perform operations of a master device 110 or operations of a slave device 120 as described above.

It is noted that although FIG. 3 illustrates a single device, the method 300 may be implemented via any number of devices performing the operations of method 300 in a distributed manner, serial manner, or a combination thereof.

In addition, the devices may be virtualized devices instantiated on servers (e.g., servers of a cloud network). As such, the representation of the hardware components of the device may be a virtualized or a physical representation, without departing from the teaching of the present disclosure. Accordingly, the method 300 may be implemented in hardware, software, or a combination thereof. It is noted that the processor 301 executing the program instructions includes the processor 301 performing the operations of the method 300 directly or indirectly. For example, the processor 301 may perform the operations in conjunction with other devices or may direct another device to perform the operations.

The present disclosure describes a device and a method for supporting mixed mode Bluetooth communications. Although, the method is described for transmitting data over a wireless channel using a Bluetooth protocol from a mobile device to a peripheral device, the Bluetooth transaction may occur between any devices that support the Bluetooth protocols used for the communication, e.g., a Basic Rate/Enhanced Data Rate (BR/EDR) protocol, a Bluetooth Low Energy (BLE) protocol, and the like.

It should be understood that the aspects of the present disclosure are described above by way of examples. However, the various aspects are exemplary and not limitations. Thus, the scope of the present disclosure should not be construed as being limited by any of the above aspects or examples. The breadth and the scope of the present disclosure should be defined in accordance with the scope and breadth of the following claims and/or equivalents.

Section A: Descriptions and Examples

A Brief Description of a Communication Using a Basic Rate/Enhanced Data Rate (BR/EDR) Protocol As described above, BR/EDR supports packets of a higher modulation rate. In one aspect, the master device 110 transmits data to a slave device 120 using the BR/EDR protocol. In return, the slave device 120 transmits ACK packets to the master device 110. In one aspect, the slave device 120 transmits the ACK packets using the BLE protocol. As described above, a high modulation rate is not necessary for the ACK packets. The master device 110 transmits packets at a modulation rate associated with a BR/EDR packet type. For example, the packet type may be one of a: DM1 (108.8 Kbits/s), DH1 (172.8 Kbits/s), 2-DH1 (345.6 Kbits/s), DM3 (387.2 Kbits/s), DM5 (477.8 Kbits/s), 3-DH1 (531.2 Kbits/s), DH3 (585.6 Kbits/s), DH5 (723.2 Kbits/s), 2-DH3 (1174.4 Kbits/s), 2-DH5 (1448.5 Kbits/s), 3-DH3 (1766.4 Kbits/s), or 3-DH5 (2,178.1 Kbits/s) packet type. The transmitters and receivers that use the BR/EDR protocol follow a slot timing where each slot is 625 µs.

The master device 110 selects the packet type based on the amount of data to be transferred to the slave device 120. For example, suppose a large amount of data is being transferred. Then, the master device 110 may select the 3-DH5 (3 Mbits/s, 5 slot) packet type to use a modulation rate of 2,178 Kbits/s. The slave device 120 follows the same slot timing and replies with ACKs with the packet type set to NULL. It is noted that the packet type is set to NULL when the recipient does not need to reply.

Figure 4:
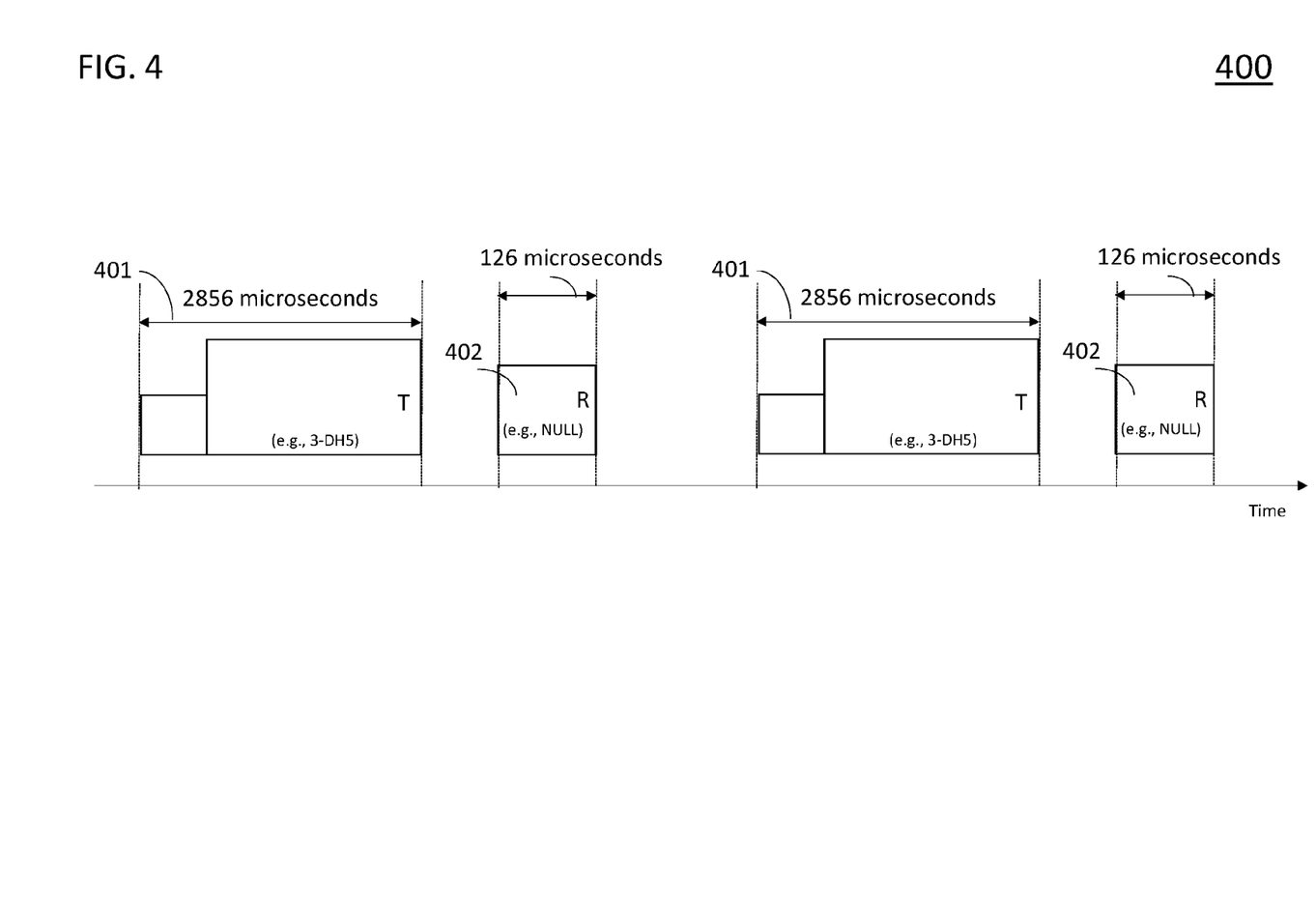
FIG. 4 illustrates a timing graph for BR/EDR transmission and reception using a 3-DH5 packet type for performing the functions described in the present disclosure.

FIG. 4 illustrates a timing graph 400 for BR/EDR transmission and reception using a 3-DH5 packet type. The times 401 during which data is transmitted by the master 110 to the slave 120 are indicated as transmit time "T", and the times 402 during which an ACK is received from the slave are indicated as receive time "R". Air time calculations for a single transaction may be computed as a sum of a transmit time and a receive time. The transmit time includes times for transmitting: an access code of 72 µs, a baseband header of 56 µs, an EDR guard time of 5 µs, a payload header and EDR sequence of 16 µs, and a payload of up to 2707 µs. The receive time includes times for transmitting an access code of 72 µs, and a header of 16 µs. In other words, for a single transaction, T is up to 2856 µs while R is 126 µs. Thus, the time for a single transaction is 2982 µs.

A Brief Description of a Communication Using a Bluetooth LE (BLE) Protocol

The transmitters and receivers that use the BLE protocol follow a strict Interframe Spacing (T_IFS) of 150 µs. Following a strict interframe spacing allows the receiver to shut down quickly—thereby saving power.

There are three types of Physical Layers (PHYs) supported in Bluetooth 5 BLE protocol. The three types of PHYs are referred to as: LE 1M, LE 2M and LE-coded.

The LE 1M and LE 2M physical layers support data rates of 1 Mbit/s and 2 Mbit/s, respectively, and error detection using Cyclic Redundancy Check (CRC). Both the LE 1M and LE 2M PHYs have relatively shorter range when compared against the range of the LE-Coded PHY. Neither the LE 1M nor the LE 2M provides error correction.

The LE-Coded PHY provides CRC as well as Forward Error Correction (FEC). Based on the type of the FEC scheme, there are two variants of the LE-Coded PHYs. The FEC scheme may use S=2 or S=8. When, S=2, the FEC encoding scheme converts each input bit to 1 output bit. When S=8, the FEC encoding scheme converts each input bit to a pattern of 4 output bits. When S=2, the range is approximately twice that of the LE 1M and the data rate is 500 Kbits/s. When S=8, the range is approximately four times that of the LE 1M and the data rate is 125 Kbits/s.

When compared against the packets transmitted using the BR/EDR protocol, the packets that use the longer range LE protocol (i.e., LE-coded) require approximately 14 dB lower SNR for a same BER performance at a receiver. For example, a transmitter using the BR/EDR protocol may transmit at +20 dBm or lower. In contrast, for the same SNR level, a transmitter using the long-range LE protocol can transmit at a rate of 125 Kbits/s at a power level 14 dBs lower that of the transmitter that uses the BR/EDR protocol. In addition, the frequency deviation of the BR modulation is higher than that used for BLE. Therefore, for the same bit error performance, a receiver receiving BLE packets needs 3-4 dB lower SNR as compared to a receiver receiving BR packets. Therefore, by using the BLE protocol, the transmitter of the slave device may use lower power—thereby further reducing the need for an external power amplifier.

Figure 5:
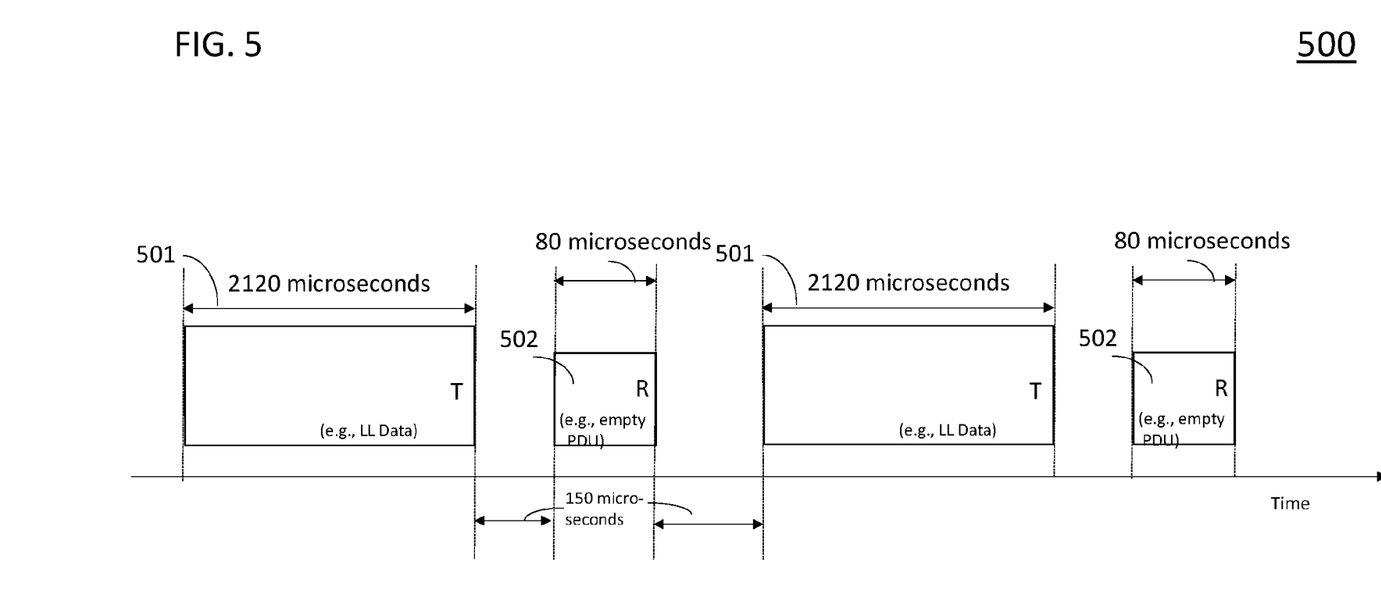
FIG. 5 illustrates a timing graph for LE 1M transmission and reception using an LE 1M PHY with a maximum transmit buffer size of 251 octets for performing the functions described in the present disclosure.

FIG. 5 illustrates a timing graph 500 for LE 1M transmission and reception using an LE 1M PHY with a maximum transmit buffer size of 251 octets. The times 501 during which data is transmitted by the master device 110 to the slave device 120 are indicated as transmit time "T", and the times 502 during which an ACK is received from the slave are indicated as receive time "R". Suppose a maximum buffer size of 251 Octets is used. Air time calculations for a single transaction may be computed as a sum of a transmit time and a receive time. The transmit time includes times for transmitting: a preamble of length 1 octet, an access address of length 4 octets, a header of length 2 octets, payload (data) of length up to 251 octets, a Message Integrity Check (MIC) of length 4 octets, and a Cyclic Redundancy Check (CRC) of length 3 octets. The receive time includes times for transmitting the preamble, access address, header and CRC. In other words, for a single transaction, T is for transmitting up to 265 octets while R is for receiving 10 octets. Thus, a single transaction using LE 1M PHY takes 2200 µs.

A Brief Description of a Mixed Mode Communication

The master device 110 transmits packets at a modulation rate associated with a BR/EDR packet type. The master device 110 selects the packet type based on the amount of data to be transferred to the slave device 120. For example, suppose a large amount of data is being transferred. Then, the master device 110 may select the 3-DH5 (3 Mbits/s, 5 slot) packet type to use a modulation rate of 2,178 Kbits/s. The slave device transmits ACKs at a modulation rate associated with a long range BLE protocol. For example, the modulation rate may be 125 Kbits/s when the long range LE-coded protocol is used with S=8.

For clarity, in accordance with a BLE standard, the LE-coded PHY field sizes and durations in microseconds when S=2 and S=8 are summarized below.

When S=2, an extended preamble is transmitted for 80 µs, a coded access address is transmitted for 256 µs, a coding indication of FEC block 1 is transmitted for 16 µs, a TERM1 of FEC of block 1 is transmitted for 24 µs, a Protocol Data Unit (PDU) is transmitted for 32 µs-4112 µs, a CRC is transmitted for 48 µs, and a TERM2 of FEC of block 2 is transmitted for 6 µs.

When S=8, an extended preamble is transmitted for 80 µs, a coded access address is transmitted for 256 µs, a coding indication of FEC block 1 is transmitted for 16 µs, a TERM1 of FEC of block 1 is transmitted for 24 µs, a PDU is transmitted for 128 µs-16448 µs, a CRC is transmitted for 192 µs, and a TERM2 of FEC of block 2 is transmitted for 24 µs.

Figure 6:
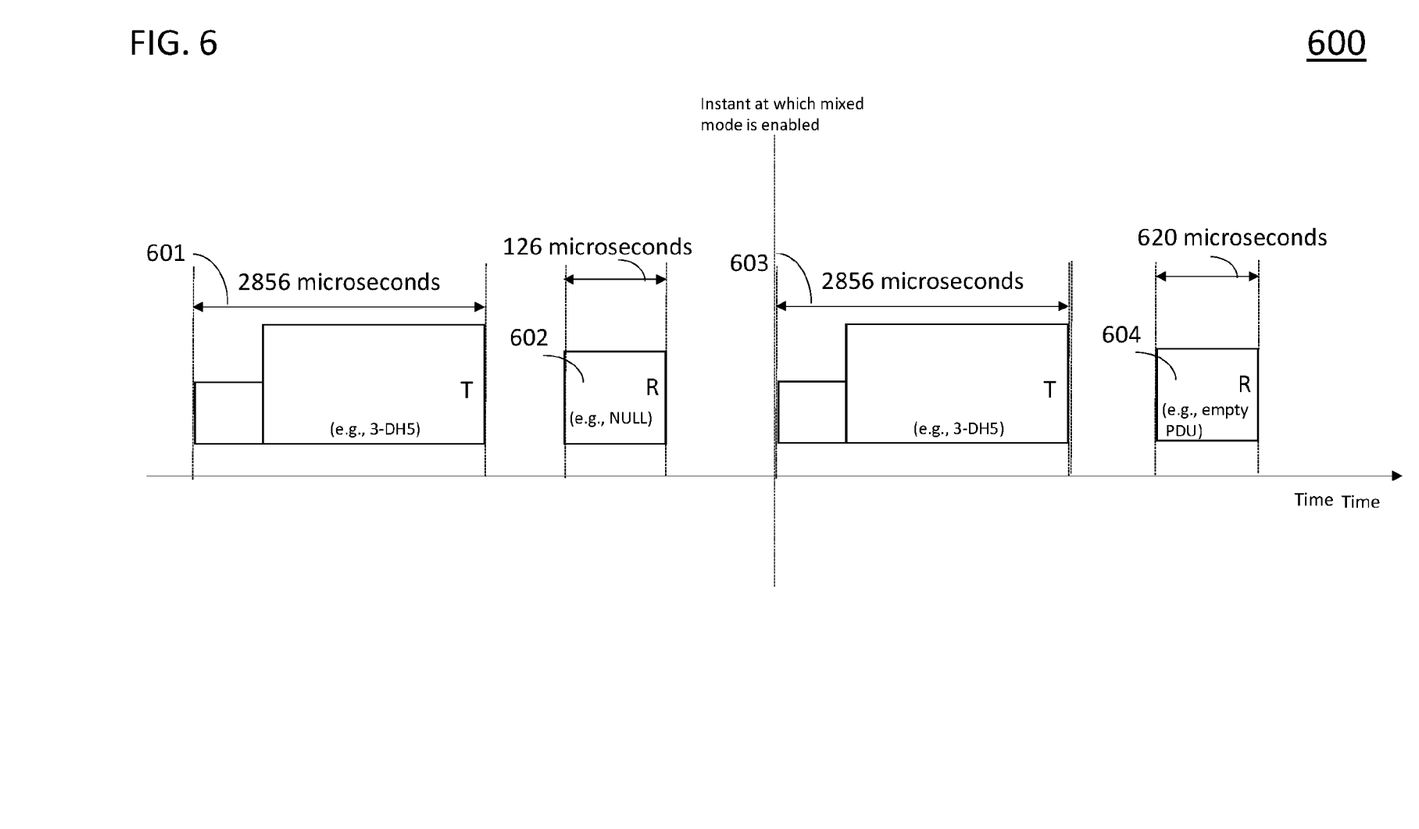
FIG. 6 illustrates a timing graph 600 for mixed mode transmission and reception for performing the functions described in the present disclosure.

FIG. 6 illustrates a timing graph 600 for mixed mode transmission and reception. The times 601 and 603 during which data is transmitted by the master device 110 to the slave device 120 are indicated as transmit time "T", and the times 602 and 604 during which an ACK is received from the slave are indicated as receive time "R". As indicated, times 601 and 603 are the same. However, the times for receiving (i.e., 602 and 604) are different as described below.

The air time calculations for a single transaction after the mixed mode communication is enabled may be computed by adding times indicated as 603 and 604, i.e., as a sum of a transmit time and a receive time. The transmit time includes times for transmitting: an access code of 72 µs, a baseband header of 56 µs, an EDR guard time of 5 µs, a payload header and EDR sequence of 16 µs, and a payload of up to 2707 µs. The receive time includes times for transmitting an extended preamble for 80 µs, a coded access address for 256 µs, a coding indication of FEC block 1 for 16 µs, a TERM1 of FEC of block 1 for 24 µs, a Protocol Data Unit (PDU) for at least 128 µs, a CRC for 192 µs, and a TERM2 of FEC of block 2 for 24 µs. In other words, for a single transaction, T is up to 2856 µs while R is 720 µs. The air time for a single transaction using the mixed mode communication (with S=8) is 3576 µs.

Example 1: A Link Manager Protocol (LMP)

As described above, the master device 110 enables the mixed mode communication.

The procedure to transition to the mixed mode communication may be initiated via a new type of LMP PDU. For example, the new PDU may be defined as "LMP_Mixed-_Mode_Req" and used for initiating the transition by the master device 110. The content of the PDU may include the connection handle of the access link, a mixed mode instant at which the link transitions to a mixed mode transition state, and an access address to be used for a BLE transmission/reception. Alternatively, the procedure to transition to the mixed mode communication may be initiated by the slave device 120 by sending a new type of LMP PDU to the master device. For example, the new PDU sent by the slave device 120 may be defined as "LMP_Mixed_Mode_Ind" and used for initiating the transition by the slave device. The content of the PDU sent by the slave device 120 may include the connection handle of the access link.

Similarly, either the master device 110 or the slave device 120 may initiate a procedure to exit the mixed mode communication. For example, the master device 110 may send a new type of PDU defined as "LMP_Mixed_Mode_exit" to the slave device 120. The content of the PDU may include the connection handle of the access link. In contrast, the slave may send a new type of PDU defined as "LL_MixedMode_exit. In other word, the LL_MixedMode_exit is used in the Link Layer (LL). Then, upon exiting the mixed mode communication, the link transitions back to a classic Bluetooth link.

Example 2: An ACK Aggregation Scheme

As described above, the master device 110 or slave device 120 initiates the aggregation.

The procedure to enable the aggregation may be initiated via a new type of Link Manager Protocol (LMP). For example, the new PDU may be defined as "LMP_AggregatedAck_Req" and used for initiating by the master device 110 to request the slave to enter the aggregation mode. The content of the PDU may include the connection handle of the access link, and an ACK instant at which the slave starts to aggregate the ACKs. Alternatively, the procedure may be initiated by the slave device by sending a new type of LMP PDU to the master device 110. For example, the new PDU sent by the slave device 120 may be defined as "LMP_AggregatedAck_Ind" and used for initiating by the slave device 120 to indicate to the master device 110 to start an LMP procedure that allows the link to enter ACK aggregation mode. The content of the PDU sent by the slave device 120 may include the connection handle of the access link.

Similarly, either the master device 110 or the slave device 120 may initiate a procedure to exit the aggregation. For example, the master device 110 may send a new type of PDU defined as "LMP_AggregatedAck_exit" to the slave device. The content of the PDU may include the connection handle of the access link. In contrast, the slave device 120 may send a new type of PDU defined as "LL_AggregatedAck_exit.

The above aggregation scheme may be implemented using a new data packet header. For a BR/EDR, the packet selection may be done explicitly through an LMP (link manager protocol) preferred rate. LMP_preferred_rate is a command that indicates to a recipient to use this frame type as much as possible. It shows a preference but it is not a mandate. For a non-limiting example, a new BR/EDR packet type may comprise 2 segments, a type code of "0101", a slot occupancy of 1, an Asynchronous Connection-Less (ACL) logical transport (1 Mbps) with a value of ADM1, and an ACL logical transport (2-3 Mbps) with a value of ADM1.

The ADM1 packet carries data information only. The sequence number indicated in the ADM1 header indicates the next expected sequence number. The payload has between 1 and 18 information bytes including the 1-byte payload header plus a 16-bit CRC code. A 32 bit MIC is present only when encryption with advanced encryption standard is enabled. The DM1 packet occupies a single time slot. The information bits, MIC bits, plus CRC bits are coded with a rate 2/3 FEC. The payload header in the ADM1 packet is 1 byte long.

For a BLE, the new packet header includes a 3 bit field that indicates whether a packet is a LL data PDU/LL, a next expected sequence number (SEQN), an acknowledgement of a received packet (ACK), more data (MD), and a length field that indicates the size (in octets) of the payload and Message Integrity Code (MIC), if included.

In one example, the PDU/LL may be defined as follows:
00=reserved;
01b=LL data PDU: continuation fragment of an Logical Link Control and Adaptation Protocol (L2CAP) message, or an empty PDU;
10b=LL data PDU: start of an L2CAP message, or a complete L2CAP message with no fragmentation;
11b=LL control PDU;
100b=LL enhanced data PDU: continuation fragment of an L2CAP message, or an empty PDU with the sequence number of the next expected PDU;
101b=LL enhanced data PDU: start of an L2CAP message, or a complete L2CAP message with not fragmentation along with the sequence number of the next expected PDU;
110b=LL control PDU with the sequence number of the next expected PDU; and
111b=Reserved.

What is claimed is:

1. A Bluetooth primary device, comprising:
a transceiver; and
a processor configured to enable the Bluetooth primary device to perform mixed mode communication with a Bluetooth secondary device, the processor being configured to:
control the transceiver to transmit to the Bluetooth secondary device a data packet based on a Bluetooth Basic Rate/Enhanced Data Rate (BR/EDR) protocol;
receive from the Bluetooth secondary device via the transceiver an acknowledgement packet (ACK) based on a Bluetooth Low Energy (BLE) protocol in accordance with an ACK aggregation scheme that aggregates a plurality of ACKs during an aggregation window comprising a number of data packets; and
wherein the aggregation window is maintained on the Bluetooth primary device and the number of data packets of the aggregation window is incremented when the ACK is received.

2. The Bluetooth primary device of claim 1, wherein the processor is configured to:
determine an enable time that begins the mixed mode communication; and
at the enable time, enable the mixed mode communication.

3. The Bluetooth primary device of claim 2, wherein the processor is configured to:
monitor, after the mixed mode communication is enabled, for the ACK from the Bluetooth secondary device via the transceiver within a period of time based on inter frame spacing of the BLE protocol.

4. The Bluetooth primary device of claim 1, wherein the processor is configured to:
determine whether the Bluetooth secondary device supports the mixed mode communication.

5. The Bluetooth primary device of claim 1, wherein number of data packets are transmitted to the Bluetooth secondary device without the Bluetooth secondary device transmitting the ACK.

6. The Bluetooth primary device of claim 1, wherein the number of data packets of the aggregation window is incremented by one each time an ACK is received up to a maximum of four.

7. The Bluetooth primary device of claim 1, wherein the processor is configured to:
measure a quality of a communication channel between the Bluetooth primary device and the Bluetooth secondary device; and
when the communication channel quality exceeds a predetermined channel quality threshold, enable the ACK aggregation scheme.

8. The Bluetooth primary device of claim 7, wherein the processor is configured to provide an indication of the aggregation window to the Bluetooth secondary device via the transceiver.

9. The Bluetooth primary device of claim 7, wherein the processor is configured to:
enable the ACK aggregation scheme at a selected time.

10. The Bluetooth primary device of claim 7, wherein the processor is configured to:
disable the ACK aggregation scheme when the communication channel quality falls below the predetermined channel quality threshold.

11. The Bluetooth primary device of claim 7, wherein the processor is configured to:
determine the quality of the communication channel after the communication channel has been measured for a predetermined period of time.

12. The Bluetooth primary device of claim 1, wherein a modulation rate of the Bluetooth BR/EDR protocol is higher than a modulation rate of the BLE protocol.

13. The Bluetooth primary device of claim 1, wherein the processor is configured to:
initiate the mixed mode communication.

14. The Bluetooth primary device of claim 1, wherein the mixed mode communication is initiated by the Bluetooth secondary device.

15. A Bluetooth secondary device, comprising:
a transceiver; and
a processor configured to enable the Bluetooth secondary device to perform mixed mode communication with a Bluetooth primary device, the processor being configured to:
receive from the Bluetooth primary device via the transceiver a data packet based on a Bluetooth Basic Rate/Enhanced Data Rate (BR/EDR) protocol;
control the transceiver to transmit to the Bluetooth primary device an acknowledgement packet (ACK) based on a Bluetooth Low Energy (BLE) protocol in accordance with an ACK aggregation scheme that aggregates a plurality of ACKs during an aggregation window comprising a number of data packets; and
wherein the aggregation window is maintained on the Bluetooth secondary device and the number of data packets of the aggregation window is incremented when a next expected sequence number of a received data packet is different from a next expected sequence number of a previously received data packet.

16. The Bluetooth secondary device of claim 15, wherein the processor is configured to:
determine a time to request the mixed mode communication; and
at the request time, request the mixed mode communication.

17. The Bluetooth secondary device of claim 15, wherein the number of data packets are received by the Bluetooth secondary device without the Bluetooth secondary device transmitting the ACK.

18. The Bluetooth secondary device of claim 15, wherein the processor is configured to:
initiate the mixed mode communication by sending a request to the Bluetooth primary device requesting that the Bluetooth primary device enable the mixed mode communication.

19. The Bluetooth secondary device of claim 15, wherein the processor is configured to control the transceiver to transmit the ACK without using an external power amplifier.

20. A communication method, comprising:
establishing a Bluetooth Basic Rate/Enhanced Data Rate (BR/EDR) protocol communication link between a primary device and a secondary device;
enabling, by either the primary device or the secondary device, a mixed mode communication based on a combination of the Bluetooth BR/EDR protocol and a Bluetooth Low Energy (BLE) protocol;
transmitting by the primary device to the secondary device a data packet based on the Bluetooth BR/EDR protocol;
transmitting by the secondary device to the primary device an acknowledgement packet (ACK) based on the BLE protocol in accordance with an ACK aggregation scheme that aggregates plurality of ACKs during a primary aggregation window maintained by the primary device comprising a number of primary data packets or during a secondary aggregation window maintained by the secondary device comprising a number of secondary data packets; and
incrementing the number of primary data packets by the primary device when the ACK is received; or
incrementing the number of secondary data packets by the secondary device when a next expected sequence number of a received data packet is different from a next expected sequence number of a previously received data packet.

21. The communication method of claim 20, further comprising:
measuring a quality of a communication channel between the primary device and the secondary device; and
if the communication channel quality exceeds a predetermined channel quality threshold, enabling an ACK aggregation scheme based on aggregating ACKs over an aggregation window.

22. The communication method of claim 21, further comprising:
disabling the ACK aggregation scheme when the communication channel quality falls below the predetermined channel quality threshold.

* * * * *